V. E. PARRISH.
MACHINE FOR RIDGING LAND.
APPLICATION FILED OCT. 30, 191..
1,339,040.
Patented May 4, 1920.
2 SHEETS—SHEET 2.
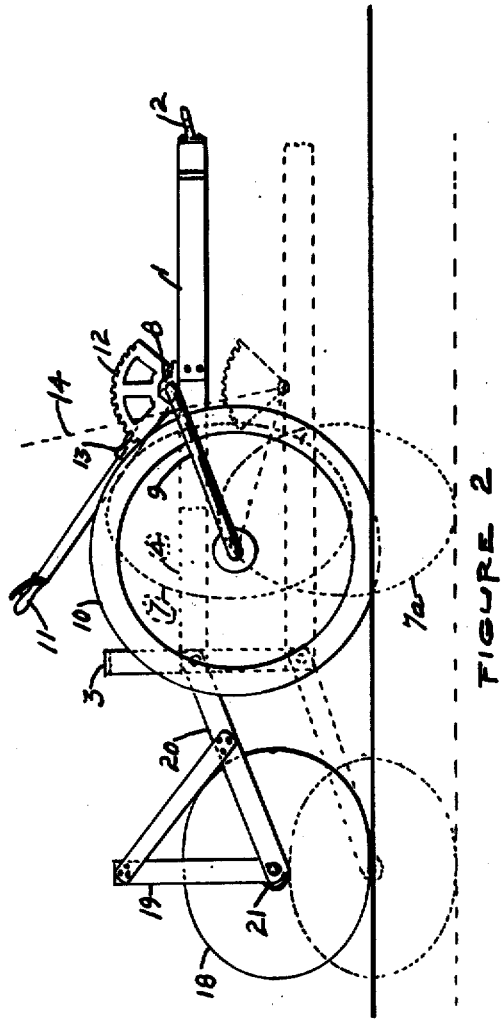
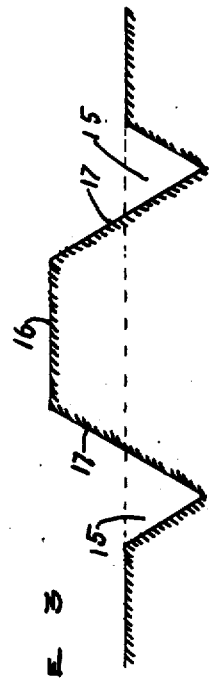
INVENTOR
Vernon E. Parrish
BY John A. Naismith
HIS ATTORNEY

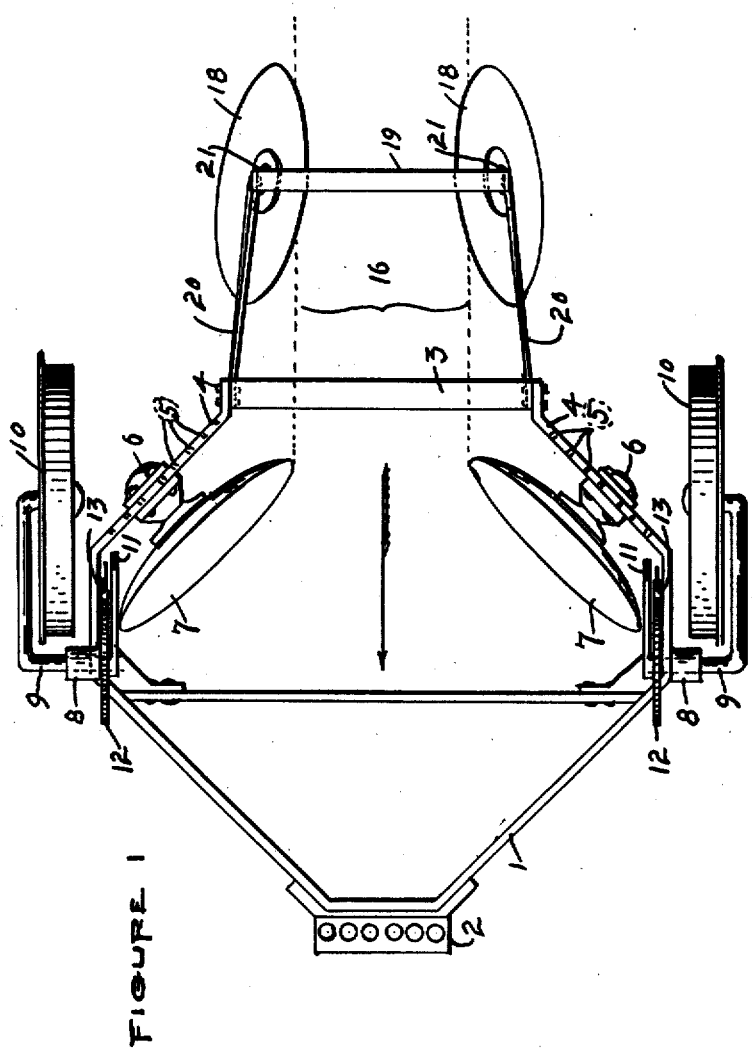

UNITED STATES PATENT OFFICE.

VERNON E. PARRISH, OF CUPERTINO, CALIFORNIA.

MACHINE FOR RIDGING LAND.

1,339,040. Specification of Letters Patent. Patented May 4, 1920.

Application filed October 30, 1919. Serial No. 334,506.

*To all whom it may concern:*

Be it known that I, VERNON E. PARRISH, a citizen of the United States, and residing at Cupertino, in the county of Santa Clara and State of California, have invented certain new and useful Improvements in Machines for Ridging Land, of which the following is a specification.

In certain methods of irrigating lands, particularly orchard lands and the like, it is customary to throw up intersecting ridges of earth to form rectangular reservoirs whereby a given area of land may be flooded with water independently of adjoining areas. In orchard irrigation these rectangular reservoirs are formed about each individual tree so that even in small acreages a large number of these reservoirs are required.

It is the object of my invention to provide a device for ridging land for irrigation or other purposes that will effectively form ridges of desired height and width; that will cut through and ridge over crossing paths or roads; that can be maintained to form a required ridge in soft ground; and that can be equipped with a compacting device for the ridge after it is formed. A further object is to provide a compacting device to coöperate with said ridge forming machine, and to provide a machine of the character indicated that will be simple in form and operation and highly efficient in its practical application.

In the drawing:

Figure 1 is a plan view of the machine with the compacting device mounted thereon.

Fig. 2 is a side elevation of the machine as shown in Fig. 1.

Fig. 3 is a diagram illustrating the results secured by the machine forming the basis of this invention.

Referring more particularly to the drawing, 1 indicates the frame of the machine provided with means at 2 for connecting the same to a tractor and having the rear cross member 3 raised a distance as shown so that it will not engage the ridge formed by the machine. The rear member 3 and the sides of frame 1 are connected by angular portions 4 provided with a series of orifices 5 in which are mounted hangers 6 carrying disks 7. In bearings 8 on frame 1 are mounted bell-crank levers 9 carrying wheels 10 on their outer ends and provided with handles 11 on their inner ends. At 12 are shown notched sectors mounted on frame 1 adjacent levers 9 whereby the said levers may be locked in a given position by means of locking device 13.

In moving over solid ground such as a road, the lever 9 is thrown into the position shown in Fig. 2 and locked in said position by means of mechanism 12—13, with frame 1 and the parts carried thereby in the raised position shown. When, however, it is in use to form a ridge in soft ground the lever 9 is thrown forward and locked in a forward position such as indicated in dotted lines at 14. This movement operates to lower frame 1 with relation to wheels 10, thereby causing disks 7 to enter the ground as shown in dotted lines at $7^a$. The angular position of the disks as shown operates to cut furrows as 15 and throw the soil removed therefrom toward the draft line of the machine and substantially higher than the general level of the ground as indicated at 16, the width of this ridge being determined by the position of disks 7 on angular members 4 along which the said disks are adjustable by means of hangers 6 and orifices 5.

In a device of this kind the disks 7 are so mounted and positioned that when once set to cut for a given depth they will throw up a uniformly regular ridge even though soil of varying character may be encountered.

It is desirable to apply some pressure to the side walls 17 of the ridge formed as hereinbefore described, whereby the same may be compacted, and large lumps of the soil broken up thereby preventing the formation of openings which would permit the passage of water through the ridge. To effect this desired result I provide a pair of disks 18 so positioned that their inner surfaces bear against walls 17. These disks are held in position by means of yoke 19 and arms 20, the latter being connected to frame 1 as shown. As the ridging machine moves forward the disks rotate on bearings 21 and press against walls 17 at the same time thereby combining a grinding action with pressure and efficiently shaping and compacting the said walls.

It is understood of course, that the machine may be used with or without the compacting device, and that changes in form, proportions, details of construction and mode of operation may be made within the scope of the appended claims.

I claim:

1. A machine for ridging land including a frame, plowing means mounted upon each side thereof and within the same and arranged to turn the plowed soil inwardly toward the draft line of the machine, a lever operatively mounted upon each side of said frame forwardly of said plows, each lever having its outer end extending backwardly in substantial parallel relation to the said draft line to a point in substantial alinement with said plows, a wheel operatively mounted on each backwardly extending portion of said levers and adjacent one of said plows, and means for locking each lever in a predetermined position.

2. A device for ridging land including a substantially open frame, supporting devices for said frame, means for adjusting said frame with relation to said supporting devices, plowing means mounted upon said frame on each side of the draft line thereof and extending a distance within said frame whereby the plowed soil may be turned inwardly toward said draft line from both sides thereof, said frame having a raised portion in the rear thereof to prevent engagement thereof with the ridge raised by said plows.

3. A machine for ridging land including a frame, supporting devices for said frame, means for adjusting said frame with relation to said supporting devices, plowing means mounted on said frame arranged to turn the plowed soil into a ridge along the draft line of the machine, and means co-operating with said machine for compacting the ridge formed by said machine, said means comprising a frame connected to the rear of said first mentioned frame, and a pair of disks pivotally mounted thereon and having their inner surfaces arranged to engage the sides of the ridge formed by said machine.

VERNON E. PARRISH.